United States Patent [19]

F'Geppert

[11] 4,006,646
[45] Feb. 8, 1977

[54] ANTI-FRICTION WORM AND WHEEL DRIVE

[75] Inventor: Erwin F'Geppert, Novi, Mich.

[73] Assignee: The United States Government as represented by the Secretary of the Army, Washington, D.C.

[22] Filed: Sept. 9, 1975

[21] Appl. No.: 611,775

[52] U.S. Cl. .................................. 74/425; 74/464
[51] Int. Cl.² .................. F16H 1/16; F16H 1/20; F16H 55/06
[58] Field of Search ............... 74/464, 459, 425

[56] References Cited
UNITED STATES PATENTS

| | | |
|---|---|---|
| 3,190,138 | 6/1965 | MacChesney ............ 74/425 |
| 3,365,974 | 1/1968 | Lieberman ............... 74/425 |
| 3,377,879 | 4/1968 | Shiwaku .................. 74/425 |
| 3,468,179 | 9/1969 | Sedgwick et al. ........ 74/425 |
| 3,489,026 | 1/1970 | Bond ...................... 74/464 X |
| 3,494,215 | 2/1970 | Fengler .................. 74/459 X |
| 3,581,592 | 6/1971 | Roehrs et al. ........... 74/464 X |
| 3,672,239 | 6/1972 | Titt ......................... 74/425 |

*Primary Examiner*—Leonard H. Gerin
*Attorney, Agent, or Firm*—Peter A. Taucher; John E. McRae; Nathan Edelberg

[57] ABSTRACT

A worm-wheel assembly wherein anti-friction balls are recirculated through helical grooves in the worm to increase the efficiency of the driving operation. This driving system is believed to have the advantages of good distribution of load forces, smooth and silent operation, very great speed reduction, high force transmission efficiency, and long service life.

5 Claims, 5 Drawing Figures

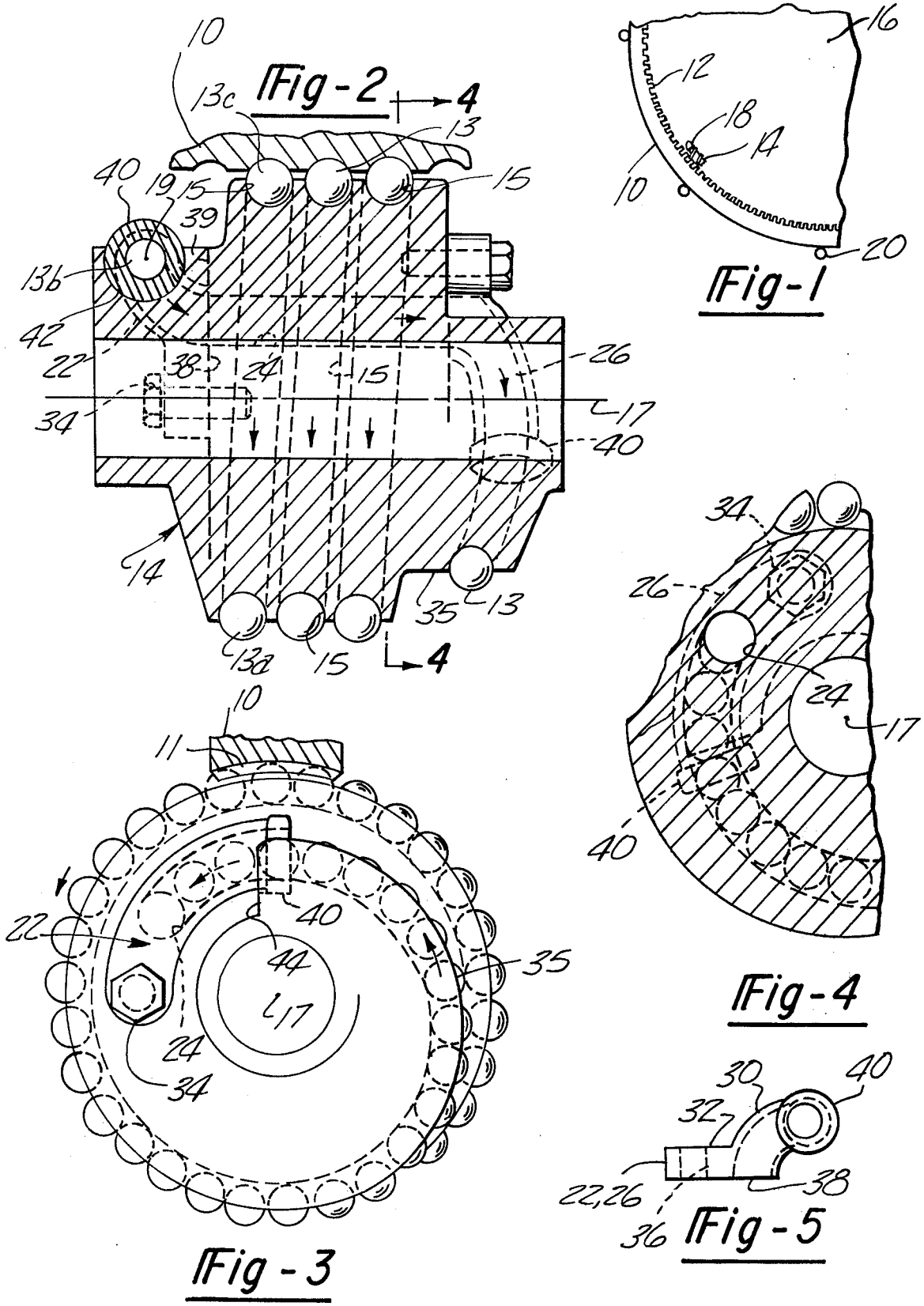

ANTI-FRICTION WORM AND WHEEL DRIVE

The invention described herein may be manufactured, used, and licensed by or for the Government for governmental purposes without payment to me of any royalty thereon.

BACKGROUND AND SUMMARY OF THE INVENTION

In military tanks the turret usually is equipped with a large ring gear which meshes with a relatively small spur gear suitably mounted within the hull; a motor is arranged to drive the spur gear, which transmits the drive force to the ring gear and turret, as described for example in U.S. Pat. No. 3,429,222 issued Feb. 25, 1969 to Whiston et al.

The weight of the turret is relatively high so that a relatively great expenditure of power is required to operate the turret at desired speeds and acceleration levels. The resultant large motors and the associated speed reducer gearing are disadvantageous in that they undesirably detract from the usable space within the tank while subtracting power that would be otherwise useful for other purposes.

The present invention seeks to provide an anti-friction worm-wheel drive that is particularly useful for efficiently transmitting a driving force from a relatively small power source to the turret of a military tank. The anti-friction drive can hopefully also be used in other worm-wheel environments where transmission efficiency is important.

THE DRAWINGS

FIG. 1 is a semi-schematic plan view of worm-wheel drive suitable for use of this invention.

FIG. 2 is a sectional view taken through a worm incorporating the invention.

FIG. 3 is a left end view of the FIG. 2 worm.

FIG. 4 is a fragmentary sectional view taken on line 4—4 in FIG. 2.

FIG. 5 illustrates a component used in the FIG. 2 worm.

FIG. 1 fragmentarily illustrates a relatively large diameter gear or wheel 10 having a number of regularly spaced helical grooves 12 formed on its inner surface. A cooperating worm 14 is arranged to drive wheel 10 clockwise and/or counterclockwise around its central axis 16. An electric motor or other power source (not shown) is suitably connected to worm 14 via a small bevel gear 18. In the case of a turret drive for a military tank, wheel 10 could be attached to the turret, and worm 14 could be suitably mounted on or in the hull; rollers 20 or other support devices could be employed to support the turret for rotation around central axis 16. The diameter of wheel 10 might be on the order of 7 or 8 feet. Worm 14 might have a diameter of 5 inches.

As seen in FIG. 1, wheel 10 is provided with helical teeth on its inner surface. However the helical teeth could be formed on the outer surface of the wheel or on the lower (flat) surface of the wheel; the worm would be placed accordingly outside or below the wheel. The shape of the worm is dictated by its position relative to the wheel. Thus, when the worm is located within the wheel, as shown in FIG. 1, the worm has a convex "keg" shape; when the worm is located outside the wheel the worm has a concave "hourglass" shape. In any event the rotational axis of the worm would be at right angles to the rotational axis of the wheel. As seen in FIG. 1, the wheel rotational axis 16 is oriented vertically and the worm rotational axis is oriented horizontally on a tangent to the wheel peripheral surface.

As seen in FIG. 2, the helical teeth on wheel 10 define circular cross-section grooves 11 that rollably receive anti-friction steel balls 13 carried within a helical groove 15 on worm 14. Helical groove 15 has a circular cross section that is slightly more than one ball radius deep taken normal to the worm rotational axis 17. Therefore the balls are captively disposed within groove 15 while projecting out of said groove a sufficient distance to transmit a driving force to wheel 10.

Balls 13 recirculate through an endless passage system comprising helical groove 15, a first return duct 22 at the left end of the worm, an internal ball passage 24 extending through the worm parallel to the worm rotational axis, and a second return duct 26 at the right end of the worm. Preferably maximum numbers of balls are used so that the passage system is substantially completely filled with balls. Arrows are shown in FIGS. 2 and 3 to illustrate the direction of ball circulation during one direction of worm rotation. When the worm is rotated in the opposite direction the balls will circulate in the reverse direction to that shown in FIG. 2.

Ball return ducts 22 and 26 are formed separately from the main body portion of the worm. As seen in FIG. 5, each return duct comprises a tubular portion 30 and a mounting tab portion 32; a screw 34 (FIG. 3 or FIG. 4) extends through a hole 36 in tab portion 32 to mount the respective ball return duct on the main body portion of the worm. Tubular portion 30 of each return duct effects a two-directional passage change. As seen in FIG. 3 the duct passage extends circumferentially; as seen in FIG. 2 the duct passage extends axially. The circumferential and axial passage directions are combined insofar as possible into one continuous bend that is devoid of sharp turns or obstructions.

Each ball return duct 22 or 26 is mounted on the main body portion of the worm so that its flange 40 fits into a socket 42 (see FIG. 1) formed as a countersunk opening in an exposed face 44 of the main worm body. After the duct is thus anchored at one end in socket 42 the screw 34 is screwed into the worm body to complete the anchorage. Socket 42 and screw 34 cooperatively secure the duct to the worm body. If desired either duct can additionally be welded in place, although such welding is not believed necessary in most cases. The balls are loaded into the defined passage system while one of the return ducts is separated from the worm body.

The transition of the balls between helical groove 15 and each return duct 22 or 26 is accomplished by forming the helical groove so that its end portions spiral gradually inwardly toward the worm rotational axis, as shown for example in FIG. 3. The spiral portion of the groove is formed in a peripheral side surface area 35 that spirals in accordance with the desired spiral angle. This gradual inward spiral of groove 15 allows the balls to leave and/or approach the helical grooves 11 in wheel 10 at a relatively slight angle (measured in a plane normal to the worm rotational axis), thereby minimizing the shock effect as each ball changes between the loaded and unloaded conditions. The purpose of the inward spiral is to shift the balls inwardly away from the outer periphery of the worm, such that each ball can enter (or leave) the associated ball return duct without interference from wheel 10. The spiral shown in FIG. 3 extends approximately one half revolution measured around axis 17.

As seen in FIG. 2, the axis 19 of the ball return duct 22 (at flange 40) is spaced a relatively large distance to the left of the associated end face 39 of the worm body. Such a large spacing is necessary to enable the duct passage to make a relatively gradual non-abrupt turn as it approaches the internal passage 24. To accomplish the desired gradual turn action the helical groove 15 is given an increased axial lead concurrent with the aforementioned inward spiral. Thus, between ball positions 13a and 13b the axial lead is made appreciably greater than between ball positions 13a and 13c. A similar increased axial lead is given to helical groove 15 at the other end of the worm, i.e. the groove area that communicates with ball return duct 26.

It is believed that the main body portion of the worm can be formed as an investment steel casting. Grooves 15 can be machined to relatively close dimensions by using a ball-shaped cutter rotating on an axis normal to the worm rotational axis; the worm body casting would be helically advanced past the cutter station to produce a complete groove-finishing operation.

In most instances the diameter of wheel 10 is many times the diameter of worm 14. The relatively slight curvature of the wheel 10 profile is not readily apparent in FIG. 2. However the slight curvature of the wheel 10 profile is such that grooves 11 continually move away from worm axis 17, then parallel to said axis, and then toward said axis, in one continuous arc centered on wheel axis 16 (FIG. 1). To simultaneously maintain a maximum number of balls 13 in pressure engagement with the groove 11 surfaces the worm should be given a keg profile (in the direction of FIG. 2), such that the mid area of the worm is displaced slightly further away from worm axis 17 than the end areas of the worm. As seen in FIG. 2, the worm has three "operating" groove areas 15; i.e. three groove areas having balls engaged with wheel 10. The central one of these operating groove areas 15 is located slightly further away from axis 17 than the end ones of the operating groove areas, to provide a keg profile. Also, the slight curvature of wheel 10 requires that the axial pitch of groove 15 (parallel to axis 17) be varied slightly to enable all of the operating balls to smoothly engage the groove 11 surfaces; the groove 11 pitch is greatest at the mid zone of the "keg" and less near the end zones. The keg profile and pitch variation are very slight, hence not visible in FIG. 2. When the worm is arranged outside the wheel the worm should be given a hour glass profile.

The illustrated worm-wheel assembly is believed to possess multiple advantages, such as good distribution of the load forces onto a relatively large number of anti-friction balls, a comparatively even and silent mode of operation, low frictional losses, very great speed reduction, ability to rotate in either direction, and long service life. Other advantages may be apparent to those skilled in the power transmission art.

I wish it to be understood that I do not desire to be limited to the exact details of construction shown and described for obvious modifications will occur to a person skilled in the art.

I claim:

1. An anti-friction drive comprising a worm and wheel arranged with their rotational axes at right angles to each other; said worm having a helical groove in its peripheral surface, said wheel having spaced grooves adapted to successively mate with the helical groove as the wheel moves past the worm; an internal ball passage extending through the worm; a first ball return duct at one end of the worm for delivering balls from the worm helical groove to the internal ball passage; a second ball return duct at the other end of the worm for delivering balls from the internal passage to the worm helical groove; and anti-friction balls filling a passage system defined by the worm groove, ball return ducts, and internal passage; the helical grooves in the worm and wheel cooperatively defining a circular cross section race that produces rolling movements of the balls through the aforementioned passage system when a rotational force is applied to the worm; the depth of the helical groove in the worm being slightly greater than the ball radius, whereby the worm groove defines two spaced lip areas that captively prevent the balls from escaping from the worm groove while they are out of contact with the wheel.

2. The anti-friction drive of claim 1: each end section of the helical groove spiralling inwardly toward the worm axis as the groove section approaches the associated return duct, whereby each return duct is located inwardly from the worm-wheel engagement plane.

3. The anti-friction drive of claim 2: each inwardly spiralling section of the helical groove having an increased axial lead, whereby the return ducts are displaced axially from the main sections of the worm groove.

4. The anti-friction drive of claim 3: each return duct being defined by a curved tube formed separately from the worm; each tube having one end thereof directed generally parallel to the worm axis in communication with the internal ball passage, and the other end thereof directed circumferentially in communication with an end section of the helical groove.

5. The anti-friction drive of claim 4: each end section of the helical groove terminating in a socket; each return duct having its other end extending into the associated socket; each return duct including a tab positionable against an end face of the worm, and a mounting screw extending through the tab into the worm, whereby the screw and socket cooperatively lock the return duct onto the worm.

* * * * *